United States Patent
Miura et al.

(10) Patent No.: US 7,476,822 B2
(45) Date of Patent: Jan. 13, 2009

(54) ROTARY CLICKING ELECTRONIC COMPONENT

(75) Inventors: Seiki Miura, Okayama (JP); Takumi Nishimoto, Okayama (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/104,645

(22) Filed: Apr. 17, 2008

(65) Prior Publication Data

US 2008/0289439 A1 Nov. 27, 2008

(30) Foreign Application Priority Data

May 25, 2007 (JP) ............... 2007-138590

(51) Int. Cl.
*H01H 19/14* (2006.01)
(52) U.S. Cl. .............. 200/564; 200/565; 200/570; 200/571; 200/336
(58) Field of Classification Search ............ 200/4, 200/6 R, 11 R–11 K, 564, 565, 567, 568, 200/570, 571, 569, 336
See application file for complete search history.

(56) References Cited

U.S. PATENT DOCUMENTS

| | | | | | |
|---|---|---|---|---|---|
| 3,189,695 | A | * | 6/1965 | Randolph | 200/11 D |
| 3,363,068 | A | * | 1/1968 | Schwab | 200/11 D |
| 3,499,133 | A | * | 3/1970 | Sykora et al. | 200/11 A |
| 4,052,573 | A | * | 10/1977 | Kojima et al. | 200/11 DA |
| 4,232,207 | A | * | 11/1980 | Kuhl et al. | 200/11 R |
| 4,481,386 | A | * | 11/1984 | Rose | 200/11 R |
| 5,380,965 | A | * | 1/1995 | Moller | 200/11 R |
| 5,606,155 | A | * | 2/1997 | Garcia | 200/11 R |
| 6,281,453 | B1 | * | 8/2001 | Uleski | 200/4 |
| 6,720,504 | B2 | * | 4/2004 | Nishimoto et al. | 200/4 |
| 6,867,379 | B2 | * | 3/2005 | Hayashi | 200/4 |

FOREIGN PATENT DOCUMENTS

| | | |
|---|---|---|
| JP | 2005-302354 | 10/2005 |
| JP | 2006-079966 | 3/2006 |

* cited by examiner

*Primary Examiner*—Michael A Friedhofer
(74) *Attorney, Agent, or Firm*—Pearne & Gordon LLP

(57) ABSTRACT

Rotary body 22 is provided with storing hole 22E, 22F in two positions point-symmetrical to the rotational center at the upper part of flange 22C, and retainers 26, 27 having steel balls 25A, 25B, steel ball receiving holes 26A, 27A, coil springs 28A, 28B are stored therein from the opening side in order, and steel ball receiving hole 26A of one retainer 26 is provided with a tolerance that enables steel ball 25A to slightly move in the horizontal direction, and click plate 24 on which steel balls 25A, 25B are resiliently contacted is disposed between rotary body 22 and bearing 23, and as a result, it is possible to maintain rhythmical clicking and clicking sound even in case of repeating the rotating operation.

6 Claims, 10 Drawing Sheets

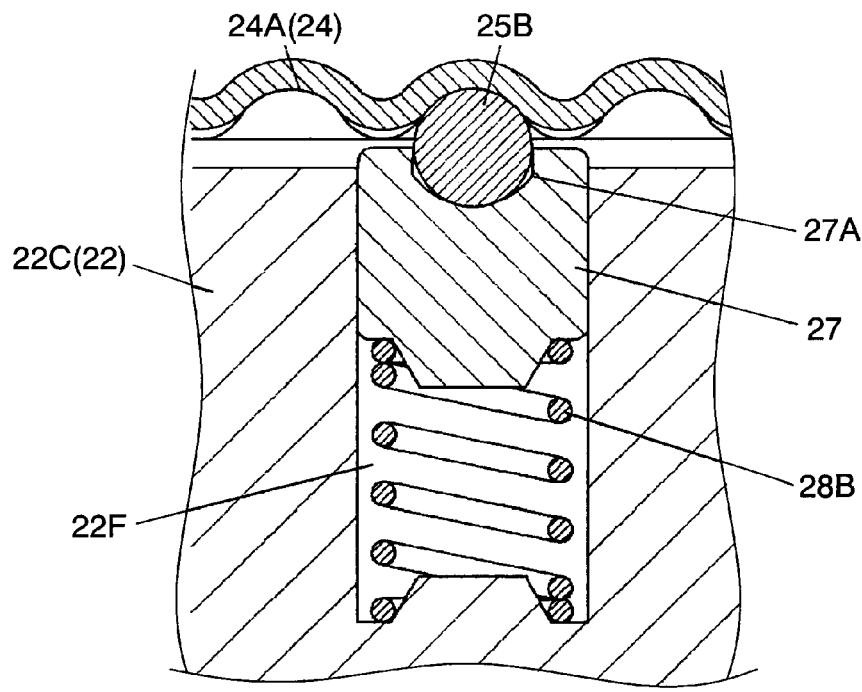
FIG. 8
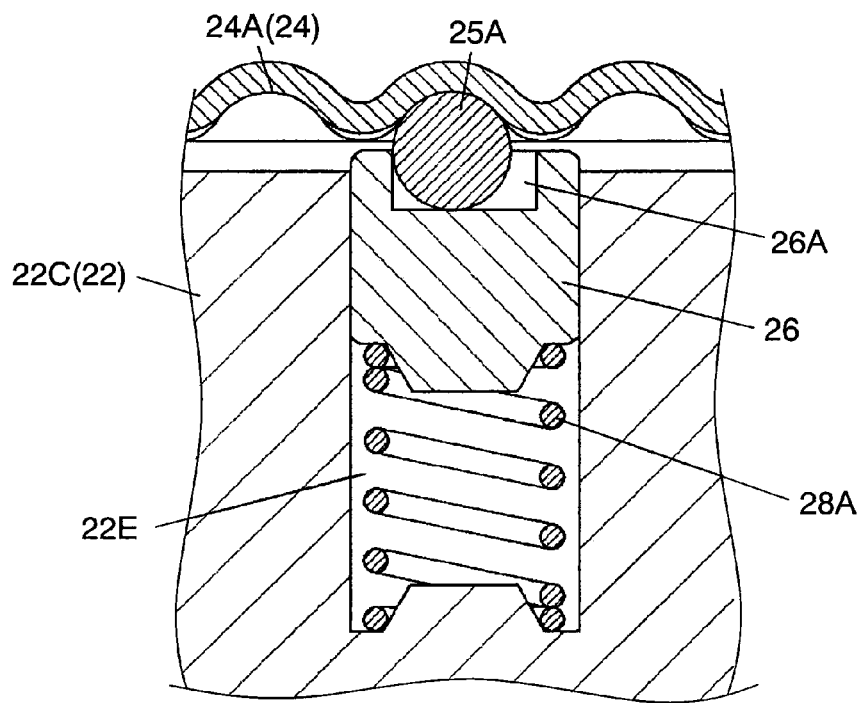
FIG. 9
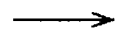

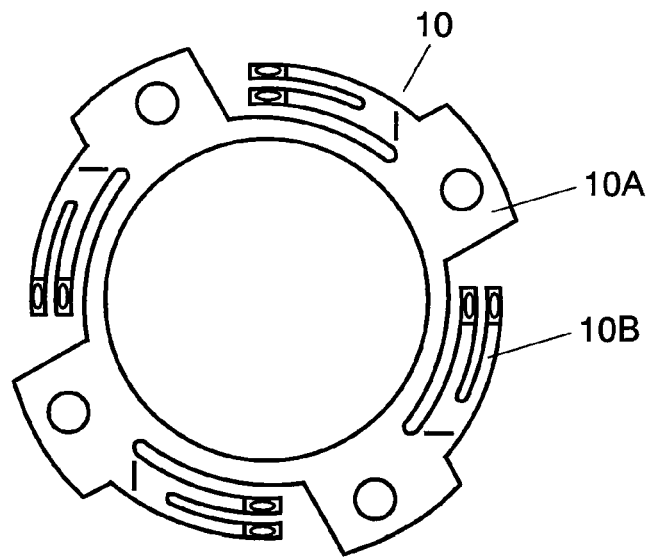
FIG. 15
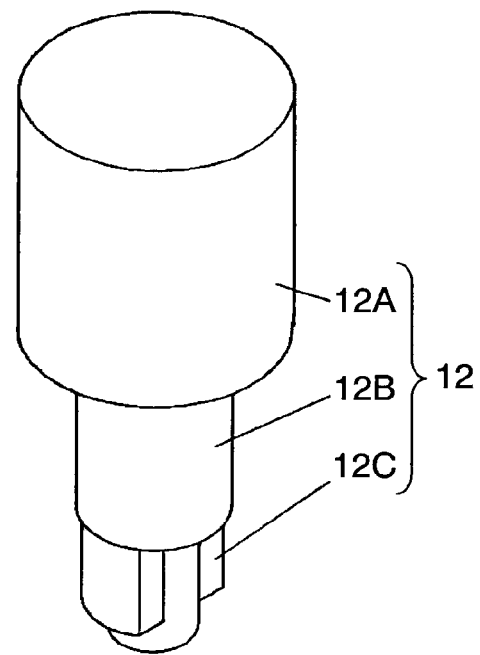
FIG. 16
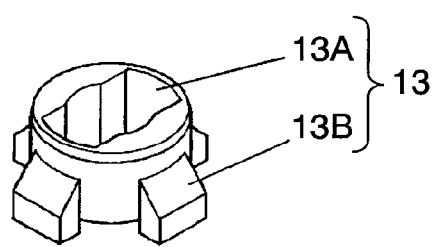

ROTARY CLICKING ELECTRONIC COMPONENT

BACKGROUND OF THE INVENTION

1. Field of the Invention

The present invention relates to a rotary clicking electronic component used in rotating sections of various electronic equipment.

2. Background Art

A rotary clicking electronic component provided with a clicking function that makes it easy to sense the amount of rotational operation is widely employed as a rotary electronic component used for setting the conditions or adjusting the output of various electronic equipment.

As a conventional rotary clicking electronic component disclosed in Unexamined Japanese Patent Publication No. 2006-79966 and Unexamined Japanese Patent Publication No. 2005-302354, a rotary clicking composite switch will be described with reference to FIG. 12 to FIG. 19.

FIG. 12 is a sectional view of a conventional rotary clicking composite switch. FIG. 13 is a top view of the case thereof. FIG. 14 is a top view of the rotary body thereof. FIG. 15 is a top view of the slide thereof. FIG. 16 is an explanatory view of the operation shaft and the driving means thereof. FIG. 17 is a top view of the clicking plate thereof. FIG. 18 is a side sectional view of the clicking plate. FIG. 19 is a sectional view of the operation shaft in a state of being pressed down.

In FIG. 12 and FIG. 13, the inside of the opening of case 1 made of insulating resin having a shape like a box opening at the top thereof is, as shown in FIG. 13, separated by annular protrusion 1A into inside opening 1B and outside opening 1C. At the inner bottom of inside opening 1B, there are provided middle contact 2 at the center and two outside contacts 3 at the outsides with the middle contact 2 therebetween. At the inner bottom of outside opening 1C, there are provided common contact 4 as a fixed conductor, first signal contact 5, and second signal contact 6 on same circumference which are electrically independent of each other. And, switch terminals 2A, 3A, 4A, 5A, 6A are individually connected to middle contact 2, outside contact 3, common contact 4, first signal contact 5, and second signal contact 6 respectively. Switch terminals 2A, 3A are led out of one side wall of case 1, and switch terminals 4A, 5A, 6A are led out of the side wall opposite to the side wall from which switch terminals 2A, 3A are led out.

As shown in FIG. 12, as to movable contact 7 formed of a circular dome-like elastic thin metal sheet which is convexly shaped upward, the bottom end of the outer periphery thereof is placed on outside contact 3, and the underside of the dome-like top is opposed to middle contact 2 with a space therebetween. Also, on the upper surface of the dome-like peak of movable contact 7 is placed disk-like push plate 8 made of insulating resin having push-portion 8A protruded at the bottom center, and a push-on switch is configured by middle contact 2, outside contact 3, and movable contact 7.

Rotary body 9 made of insulating resin shown in FIG. 12 and FIG. 14 includes columnar portion 9B having through-hole 9A grooved in the middle thereof and flange 9C below columnar portion 9B. On the upper surface of flange 9C is radially disposed linear convex-concave portion 9D along the diametrical direction, and on the underside thereof is disposed slide 10 as a movable conductor shown in FIG. 15. Slide 10 is formed of a conductive metal sheet and has a shape formed of annular flat plate 10A fixed on rotary body 9 and sliders 10B disposed at four portions every 90 deg at equal angles therefrom. As rotary body 9 is rotated, each slider 10B makes a sliding motion while moving on and off the common contact 4, first signal contact 5, and second signal contact 6 disposed on the inner bottom surface of outside opening 1C of case 1 thereunder.

Bearing 11 shown in FIG. 12 is placed in such manner that the upper part of the opening of case 1 is covered with collar 11A, which is provided with hollow cylindrical portion 11B protruding upward from the center of collar 11A and having central hole 11C. Columnar portion 9B of rotary body 9 is rotatably fitted in cylindrical portion 11B.

Nearly bar-like shaft 12 shown in FIG. 12 has a shape such that each of operational portion 12A positioned at the top, columnar middle portion 12B, and nearly oval mount 12C at the bottom has a shouldered portion. And, operational portion 12A is positioned above bearing 11, the upper part of columnar middle portion 12B is rotatably and vertically movably fitted in central hole 11C of bearing 11, and the lower part under middle portion 12B is positioned in through-hole 9A of rotary body 9. On the mount 12C at the bottom is fitted and fixed driving means 13 in such manner as to move along with the rotational and vertical movement of operation shaft 12.

Driving means 13 shown in FIG. 12 includes, as shown in FIG. 16, oval inner hole 13A in which the mount 12C of operation shaft 12 is fitted, and also, there are provided protrusions 13B extending from the columnar outer periphery in four directions at equal angles. The four protrusions 13B engage the four grooves 9E (see FIG. 14) disposed in through-hole 9A of rotary body 9. Also, the lower end of mount 12C of operation shaft 12 is in contact with the upper surface of push plate 8 placed on movable contact 7.

And, as shown in FIG. 12, annular plate spring 14 (click plate) formed of elastic metal sheet is fitted to the underside of collar 11A of bearing 11. As to plate spring 14, as shown in FIG. 17 and FIG. 18, the both sides are obliquely bent downward, and bend protrusion 14A is disposed on one end of the bent portion. Bend protrusion 14A of plate spring 14 resiliently engages convex-concave portion 9D provided on the upper surface of flange 9C of rotary body 9. And, bracket 15 shown in FIG. 12 is disposed on the upper surface of collar 11A of bearing 11, letting cylindrical portion 11B of bearing 11 protrude upward, and its lower end at each side is bent so as to hold the case 1 from both sides, thereby combining each of the above members.

Here, in the standard state of FIG. 12 without operating the operation shaft 12, an activating force is applied to operation shaft 12 upward from movable contact 7 via push-plate 8. Accordingly, four protrusions 13B of driving means 13 fixed on mount 12C of operation shaft 12 are in a state of being stationary in corresponding four grooves 9E in through-hole 9A of rotary body 9. Also, rotary body 9 is always activated downward by the spring pressure of plate spring 14 being in resilient contact with convex-concave portion 9D at the upper surface of flange 9C even when the elastic force of slider 10B thereunder or the activating force of movable contact 7 is applied thereto. Accordingly, it is configured in that the lower peripheral edge of flange 9C is in contact with outer periphery shoulder 1D disposed on the outer periphery wall of the opening of case 1, which is therefore rotatable but not movable up and down.

In a rotary clicking composite switch having such a configuration, when operational portion 12A of operation shaft 12 is rotated, driving means 13 fitted on the mount 12C rotates and rotary body 9 stopped by protrusions 13B of driving means 13 rotates as well. Due to the rotation of rotary body 9, four sliders 10B of slide 10 under flange 9C sequentially slide on common contact 4, first signal contact 5, and second signal contact 6 which are disposed in outside opening 1C of case 1.

In this way, the on-off operation between common contact 4 and first signal contact 5 via slider 10B causes the generation of first pulse signal from corresponding switch terminals 4A and 5A. Similarly, the on-off operation between common contact 4 and second signal contact 6 via slider 10B causes the generation of second pulse signal from corresponding switch terminals 4A and 6A. Also, clicking is sensible as bend protrusion 14A of plate spring 14 resiliently slides on convex-concave portion 9D at the upper surface of flange 9C of rotary body 9.

Next, when operational portion 12A of operation shaft 12 is pushed down, as shown in FIG. 19, push-plate 8 is pushed downward by the lower end of mount 12C thereunder. As a result, the dome-like peak portion of movable contact 7 is pushed by push-portion 8A of push-plate 8, then the dome-like peak portion is resiliently deformed, and the underside thereof comes in contact with middle contact 2 opposed thereto. In this way, the switch is turned on, conducting between middle contact 2 and outside contact 3 via movable contact 7, that is, between switch terminals 2A and 3A.

In this case, driving means 13 fixed on operation shaft 12 disengages from rotary body 9 of protrusion 13B and moves downward, and then the downward movement is not transferred to rotary body 9.

And, when the pushing force to operation shaft 12 is released, movable contact 7 is restored to its initial dome-like shape by its own resiliently restoring force. At the same time, movable contact 7 pushes up the lower end of mount 12C of operation shaft 12 via push-plate 8, then the push-on switch insulated between middle contact 2 and outside contact 3 is shifted back to the state shown in FIG. 12.

Recently, a rotary clicking electronic component used in AV equipment for vehicles in particular is required to be intensified in clicking and especially desired to be durable without deterioration of smooth clicking even in case of repeating the rotating operation, and also there is a demand for those capable of creating a rhythmical clicking sound as well as clicks sensible to the finger.

However, the conventional rotary clicking composite switch as a rotary clicking electronic component is configured in that bend protrusions 14A disposed at the end of plate spring 14 made of metal resiliently slide on convex-concave portion 9D of rotary body 9 mad of insulating resin in order to generate clicks. Accordingly, when the rotating operation is repeated for a long period of time, convex-concave portion 9D of rotary body 9 wears out and the shoulders of convex-concave portion 9D are deteriorated, causing the intensity of clicking weakens. Also, the conventional clicking mechanism using plate spring 14 made of metal and rotary body 9 made of insulating resin involves such a problem that it is difficult to create a rhythmical clicking sound.

SUMMARY OF THE INVENTION

The present invention is intended to solve such a conventional problem, and the object of the invention is to provide a rotary clicking electronic component capable of obtaining smooth clicking and rhythmical clicking sound for a long period of time even in case of repeating the rotating operation.

The present invention is a rotary clicking electronic component comprising an insulating case having a fixed conductor disposed at the inner bottom of opening, which is upwardly opening, and a terminal connected to the fixed conductor and led out; a rotary body disposed in the opening of the case and having a movable conductor at the bottom thereof, which engages the fixed conductor; a bearing fitted on the upper surface at the opening of the case; an operation shaft for rotationally operating the rotary body; and a clicking mechanism disposed between the bearing and the rotary body, wherein the clicking mechanism includes a click plate having a waved convex-concave surface which is disposed under the bearing in the direction of circumference concentrically with the rotational center of the rotary body at the bottom thereof, and an upwardly opening storing hole disposed at the upper part of the rotary body in which the steel ball, a retainer for retaining the steel ball, and an elastic member for forcing the steel ball to act on the waved convex-concave surface of the click plate via the retainer are stored from the opening side in order.

In this configuration, since the waved convex-concave surface of the click plate is positioned along the surface of the steel ball, when the rotary body is rotated, the steel ball smoothly comes in contact with the click plate thereby suppressing the wearing of contacting portions and improving the durability. Also, it is possible to obtain clear rhythmical clicking sound with the click plate and steel ball.

Also, the present invention is configured in that the storing hole at the upper part of the rotary body is provided at a plurality of positions equal distance from the rotational center, and the steel ball, retainer and elastic member are stored in each of the plurality of storing holes, and a plurality of steel balls resiliently coming in contact with the waved convex-concave surface of the click plate are simultaneously positioned at the bottom of the concave or the peak of the convex of the waved convex-concave surface.

In this way, the coil spring pressure per position can be reduced without changing the clicking intensity as a whole, and it is possible to suppress wearing of the parts.

The present invention is configured in that the storing holes at the upper part of the rotary body are formed of the first storing hole and the second storing hole disposed at positions equal distance from the rotational center, and the first and second steel balls, the first and second retainers, the first and second elastic members are stored in each of the first storing hole and the second storing hole, and there is provided a tolerance between the first steel ball and the steel ball receiving hole of the first retainer so that the first steel ball goes over the convex peak of the waved convex-concave surface of the click plate before the second steel ball in the second storing hole goes over the convex peak of the waved convex-concave surface of the click plate and reaches the lowest concave bottom when the rotary body is rotated relatively to the click plate.

In this way, just after the second steel ball gets into the lowest concave bottom of the click plate, the first steel ball gets into the lowest concave bottom delaying for the amount of tolerance and bumps against the next slope of the click plate. In this case, because there is provided a tolerance horizontally between the first steel ball and the steel ball receiving hole of the first retainer, the first steel ball bumping against the slope also bumps against for example the wall surface of the steel ball receiving hole, repeatedly bumping in a short time and increasing the bumping sound, and thereby, it is possible to obtain clear rhythmical clicking sound.

The present invention is configured in that the waved convex-concave surface of the click plate is formed in shape along the curved surface drawn by the surface of the steel ball when the steel ball engaging therewith moves in the direction of circumference while moving up and down.

In this configuration, since the waved convex-concave surface of the click plate is formed in curved shape along the steel ball surface, when the rotary body is rotated, the steel ball and the click plate come in line contact with each other, thereby suppressing the wearing of the portions and improving the durability.

In the present invention, the click plate is made of metal.

Accordingly, the parts come in smooth contact with each other, and still, it is possible to obtain clearer rhythmical clicking sound.

In the present invention, the insulating case is made of resin.

Accordingly, the electrical reliability of the switch capable of obtaining clear rhythmical clicking sound is enhanced.

BRIEF DESCRIPTION OF THE DRAWINGS

FIG. 8 is a partially enlarged view of a clicking mechanism in the exemplary embodiment.

FIG. 9 is an explanatory diagram for describing the clicking mechanism in the exemplary embodiment.

FIG. 15 is a top view of a slide of the switch.

FIG. 16 is an explanatory diagram for describing the relation between operation shaft and driving means of the switch.

DETAILED DESCRIPTION OF THE INVENTION

Figure 1:
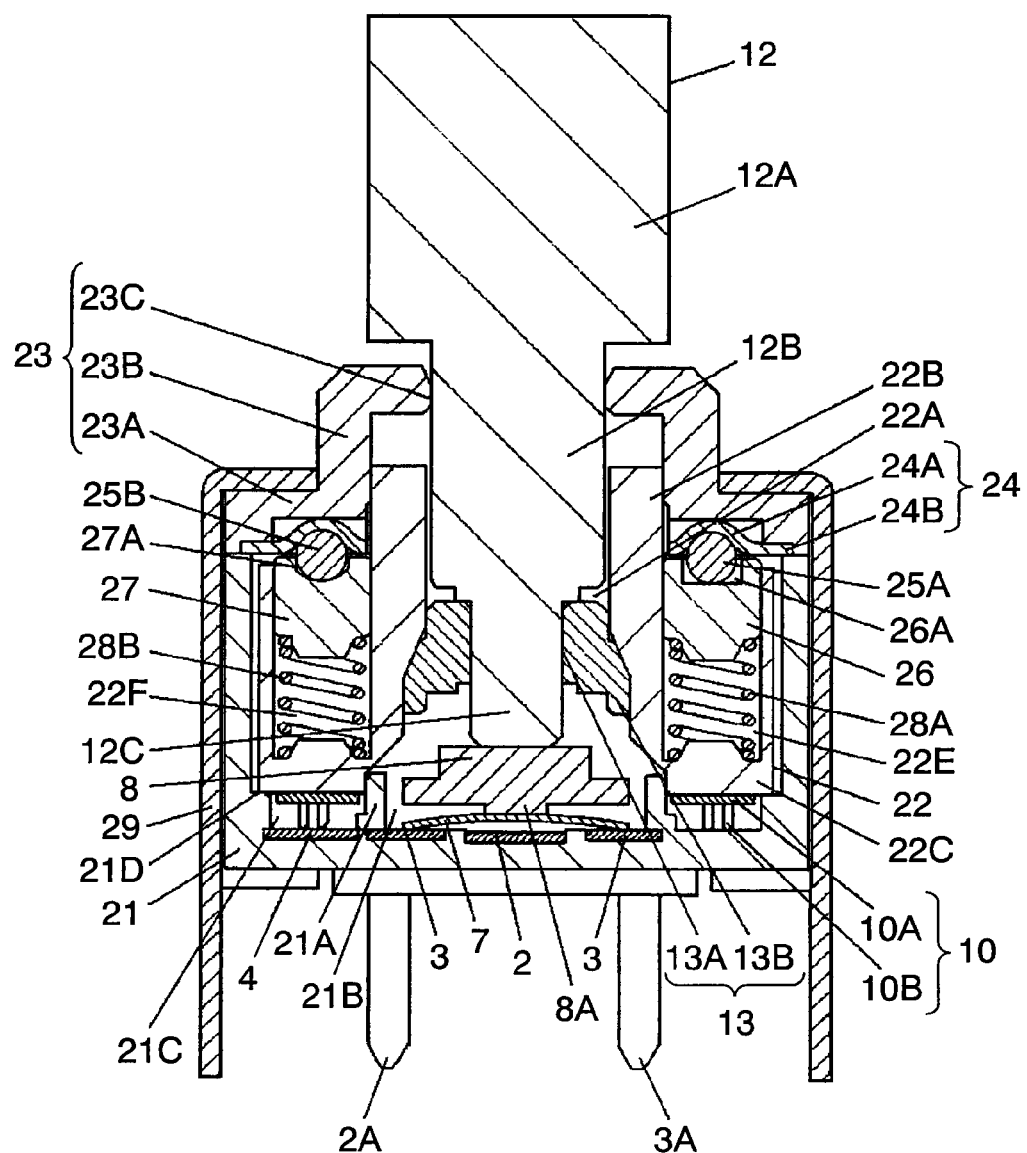
FIG. 1 is a sectional view of a rotary clicking composite switch in one exemplary embodiment of the present invention.

The rotary clicking electronic component in the exemplary embodiment of the present invention will be described in the following with reference to the drawings. The same components as in the conventional configuration are given same reference numerals, and the detailed description is omitted.

Figure 2:
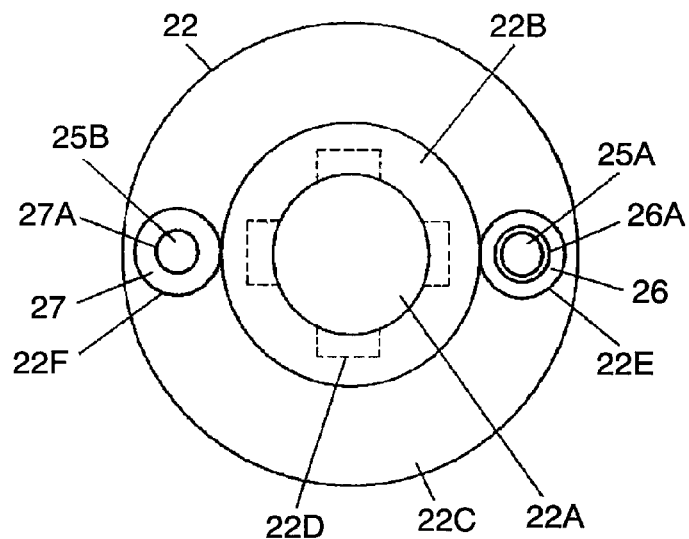
FIG. 2 is a top view of a rotary body equipped with clicking members in the exemplary embodiment.
Figure 3:
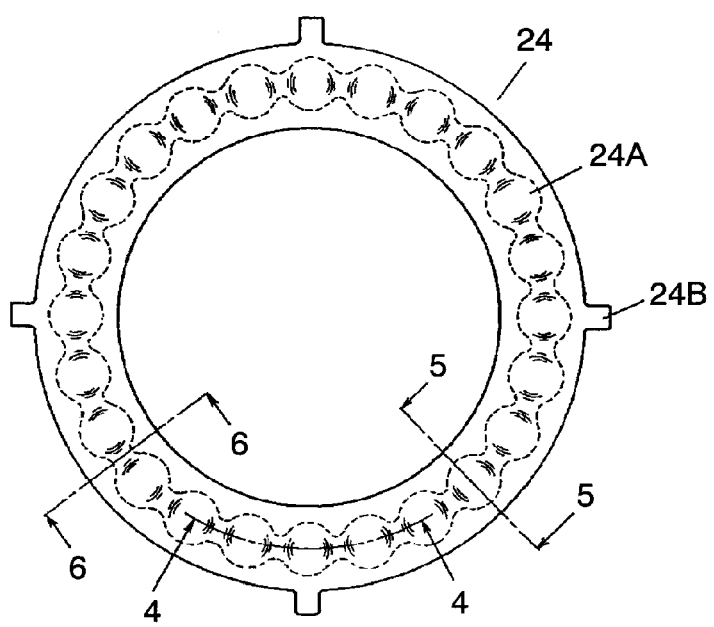
FIG. 3 is a top view of a click plate in the exemplary embodiment.
Figure 4:
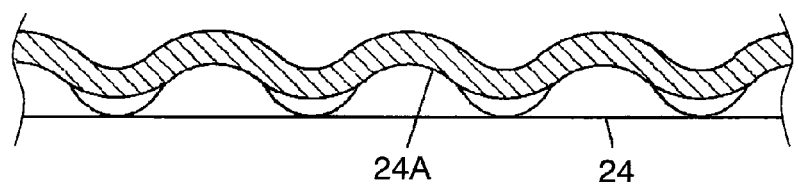
FIG. 4 is a sectional view along the line 4-4 in FIG. 3.
Figure 5:
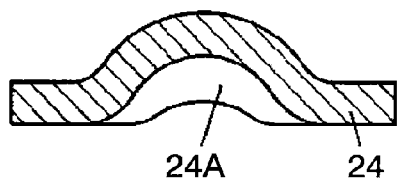
FIG. 5 is a sectional view along the line 5-5 in FIG. 3.
Figure 6:
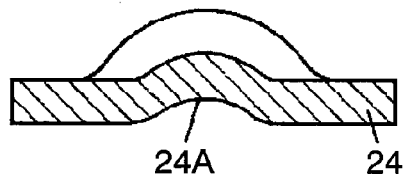
FIG. 6 is a sectional view along the line 6-6 in FIG. 3.
Figure 7:
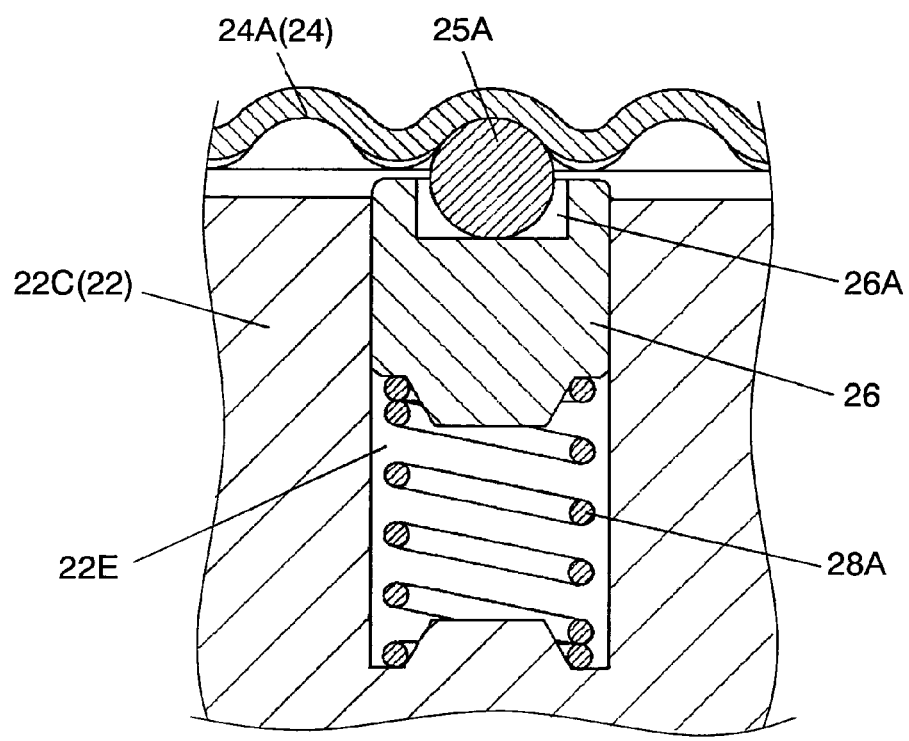
FIG. 7 is a partially enlarged view of a clicking mechanism in the exemplary embodiment.
Figure 10:
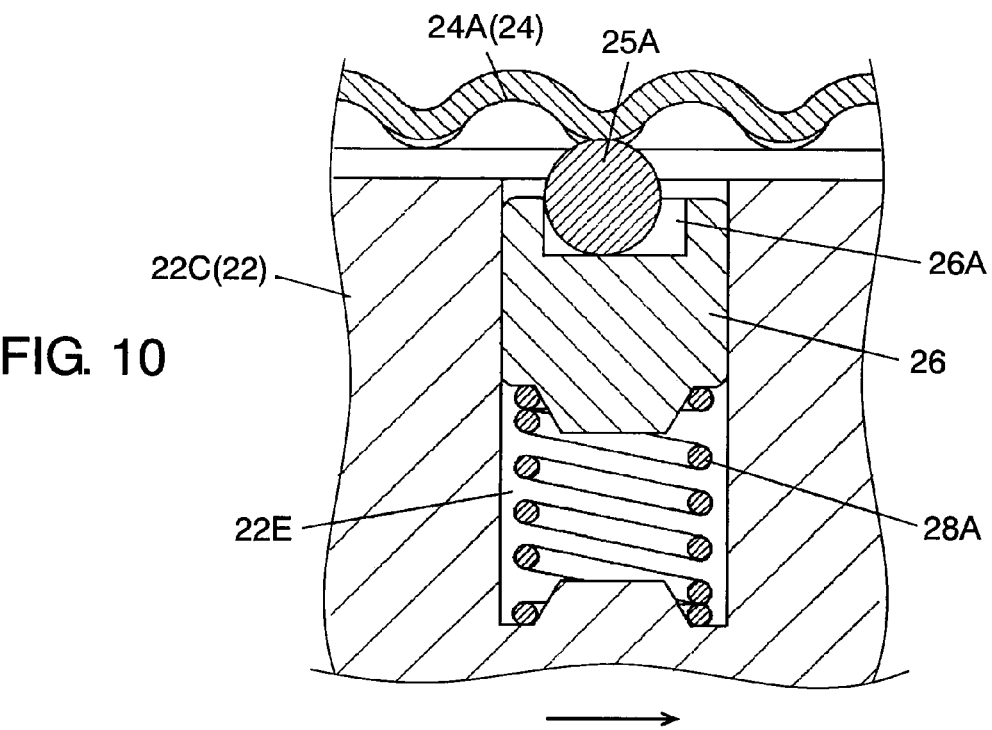
FIG. 10 is an explanatory diagram for describing the clicking mechanism in the exemplary embodiment.
Figure 11:
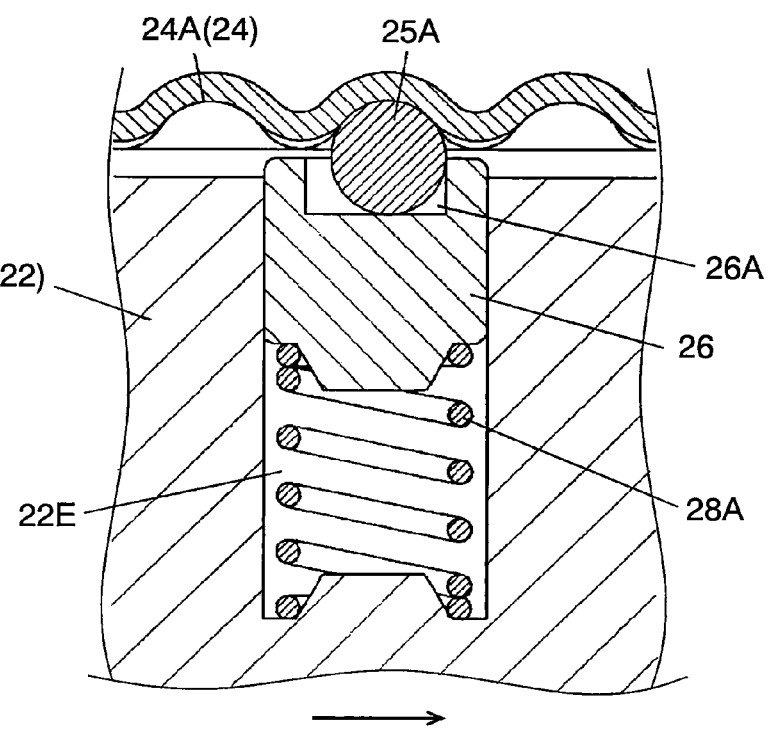
FIG. 11 is an explanatory diagram for describing the clicking mechanism in the exemplary embodiment.
Figure 12:
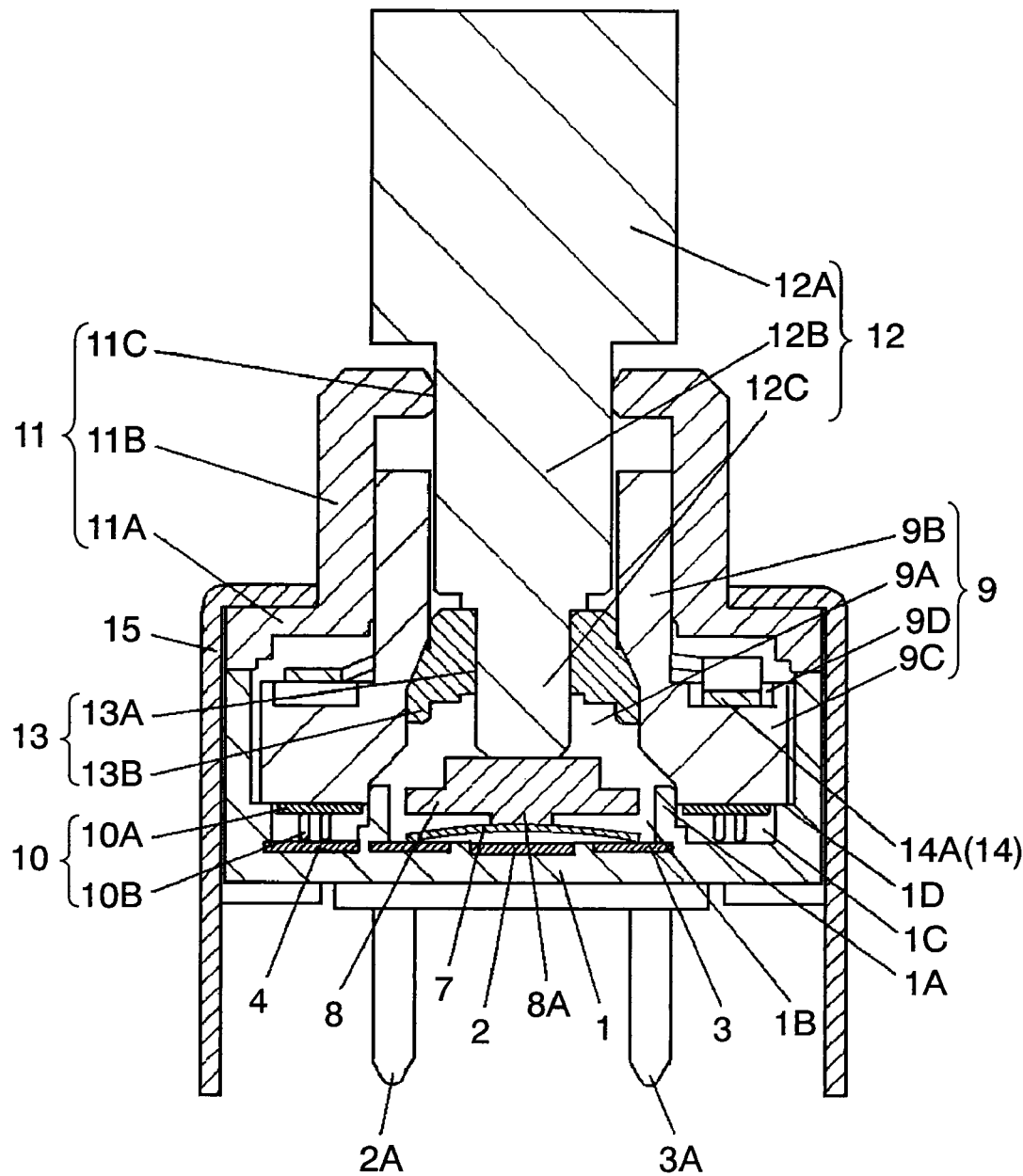
FIG. 12 is a sectional view of a conventional rotary clicking composite switch.
Figure 13:
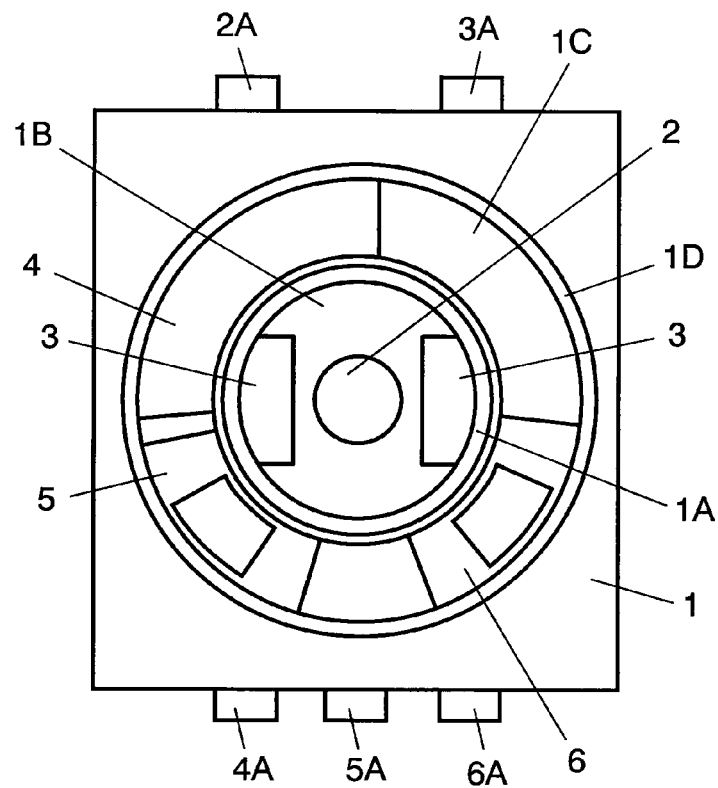
FIG. 13 is a top view of a case of the switch.
Figure 14:
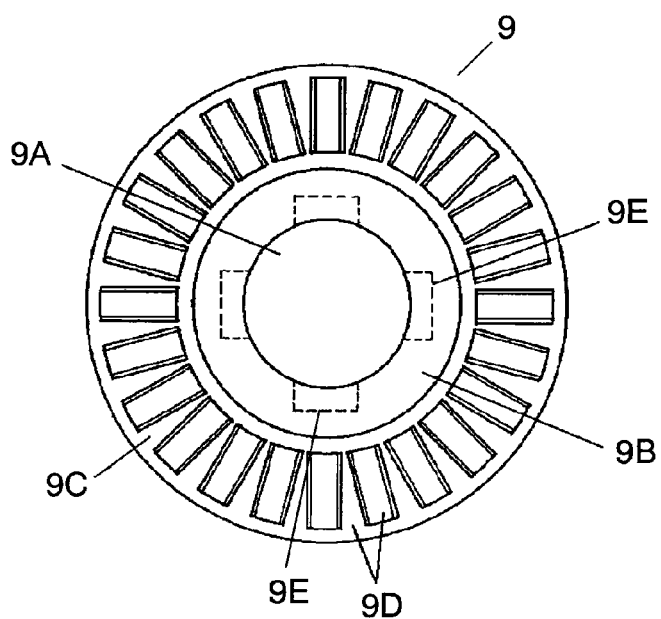
FIG. 14 is a top view of a rotary body of the switch.
Figure 17:
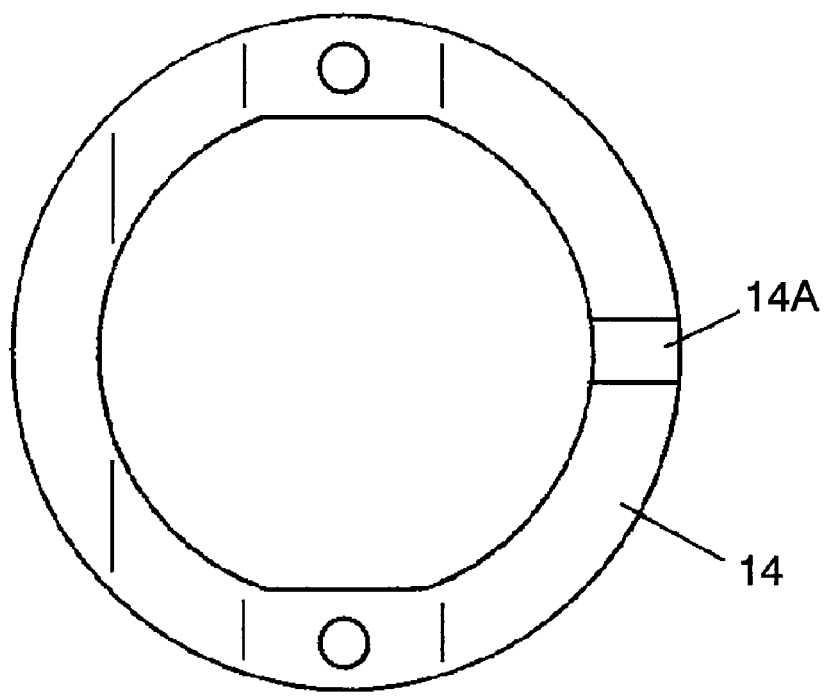
FIG. 17 is a top view of a click plate of the switch.
Figure 18:
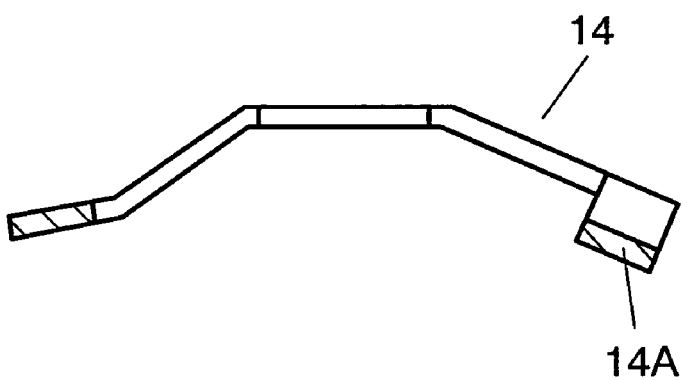
FIG. 18 is a side sectional view of a click plate of the switch.
Figure 19:
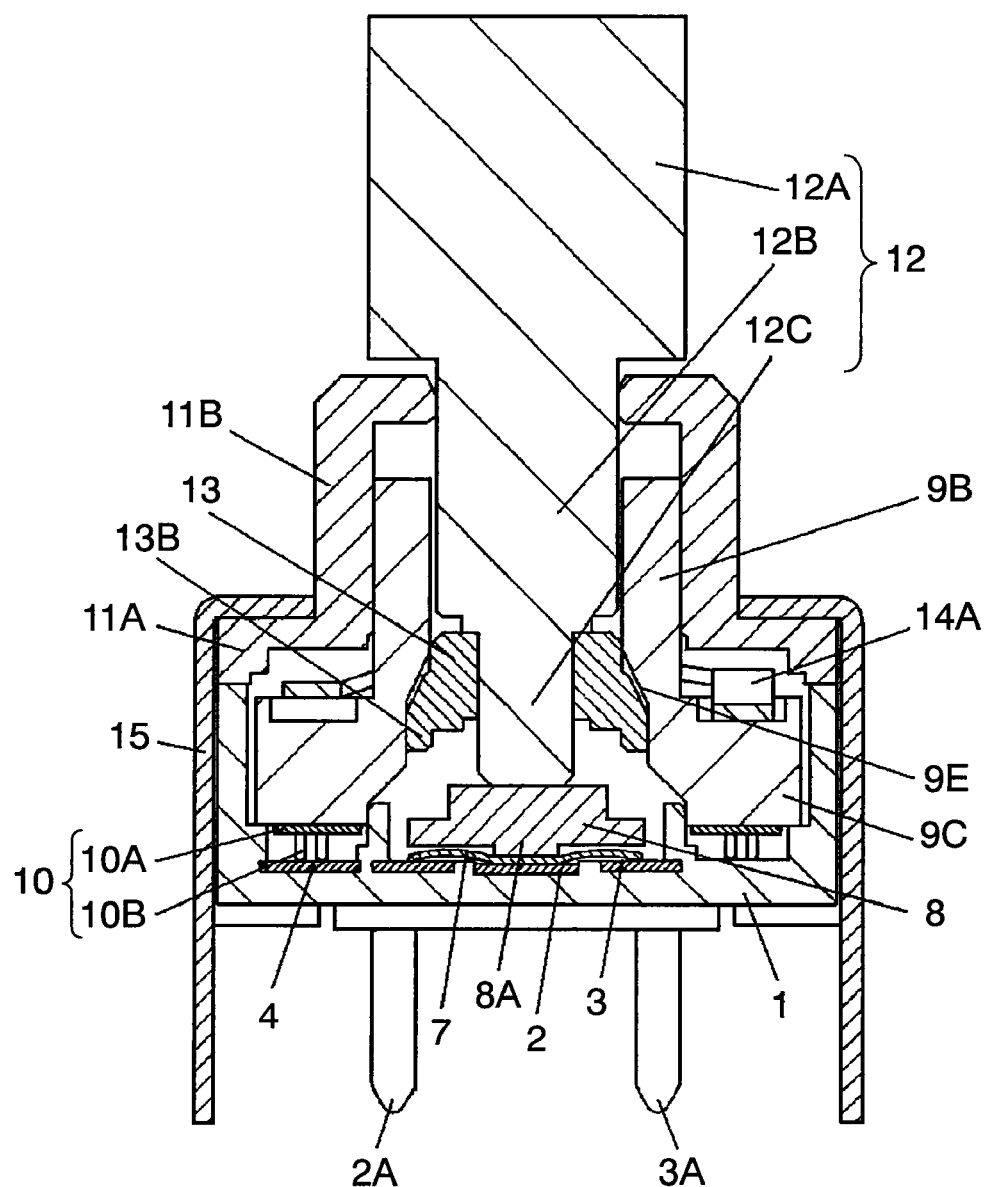
FIG. 19 is a sectional view of an operation shaft in a state of being pushed of the switch.

FIG. 1 is a sectional view of a rotary clicking composite switch as a rotary clicking electronic component in one exemplary embodiment of the present invention. FIG. 2 is a top view of a rotary body equipped with clicking members. FIG. 3 is a top view of a click plate thereof. FIG. 4 is a sectional view along the line 4-4 in FIG. 3. FIG. 5 is a sectional view along the line 5-5 in FIG. 3. FIG. 6 is a sectional view along the line 6-6 in FIG. 3. FIG. 7 and FIG. 8 are partially enlarged views of a clicking mechanism thereof. FIG. 9 to FIG. 11 are explanatory diagrams for describing the operation of the clicking mechanism.

In the figure, the opening of case 21 made of insulating resin which is formed in box shape and upwardly opening is divided into inside opening 21B and annular outside opening 21C positioned outside with annular protrusion 21A disposed at the center as a borderline between them. The outer periphery wall that is the outer side of outside opening 21C is provided with peripheral shoulder 21D abutting the outer bottom edge of rotary body 22 described later. And, at the inner bottom of inside opening 21B, there are provided middle contact 2 and outside contacts 3 on either side thereof. At the inner bottom of outside opening 21C, common contact 4 as fixed conductor, first signal contact 5, second signal contact 6 (first signal contact 5 and second signal contact 6 do not appear in the figure) are disposed on same circumference in a way of being electrically independent of each other. Switch terminals 2A, 3A, 4A, 5A, 6A (switch terminals 4A, 5A, 6A do not appear in the figure) connected to contacts 2 to 6 are led out of the opposing side walls of case 21.

And, dome-like movable contact 7 is placed on outside contact 3 in inside opening 21B, and further, push-plate 8 made of insulating resin with push-portion 8A abutted thereon is placed on the upper middle surface of movable contact 7. Although the configuration is same as in the conventional example, the peripheral wall of case 21 is formed higher than the one described in the conventional example so that thick flange 22C of rotary body 22 described later can be stored in the opening.

Also, rotary body 22 made of insulating resin includes columnar portion 22B protruding upward at the center of flange 22C, and through-hole 22A vertically piercing the centers of columnar portion 22B and flange 22C. And, same as in the conventional example, slide 10 as a movable conductor is fixed on the underside of flange 22C, having four sliders 10B on annular flat plate 10A, which move on and off each of common contact 4, first signal contact 5, and second signal contact 6 disposed in outside opening 21C of case 21 when rotary body 22 is rotated. The outer bottom edge of flange 22C is abutting the peripheral shoulder 21D of case 21.

And, the upper part of the opening of case 21 is covered with collar 23A of bearing 23, and the outer periphery of columnar portion 22B of rotary body 22 is rotatably fitted in hollow cylindrical portion 23B having central hole 23C upwardly protruding from the center of collar 23A.

Also, operation shaft 12 is disposed in such manner that operational portion 12A is positioned above central hole 23C of bearing 23, and that the upper part of columnar middle portion 12B is rotatable and vertically movable in central hole 23C at the upper end thereof. The lower part of middle portion 12B and nearly oval mount 12C of operation shaft 12 are positioned in through-hole 22A of rotary body 22, and its lower end is abutted on push-plate 8. Driving means 13 with mount 12C set through middle hole 13A is integrally fixed on mount 12C of operation shaft 12. And the same as in the conventional example, an upward activating force is applied from movable contact 7 to operation shaft 12 via push-plate 8.

Further, with operation shaft 12 activated as described above, as to driving means 13, four protrusions 13B protruding sideways from the outer periphery thereof are stationary in four grooves 22D (see FIG. 2) disposed in positions corresponding to through-hole 22A of rotary body 22. And, when operation shaft 12 is rotated, rotary body 22 rotates with it via driving means 13, but when operation shaft 12 is pushed down, protrusion 13B is disengaged from groove 22D and then rotary body 22 is not driven along with the movement of driving means 13.

Bracket 29 formed of metal plate is arranged on collar 23A allowing cylindrical portion 23B of bearing 23 to be protruded, which serves to hold the case 21 from both sides, and its lower end is bent inwardly to hold the case 21 tight, thereby securely combining each of the above members.

The above configuration is same as the conventional one, but the present invention is different from the conventional example in clicking mechanism configured between collar 23A of bearing 23 and flange 22C of rotary body 22. The clicking mechanism is described in the following.

The clicking mechanism of the present invention is configured in that an elastic contact portion disposed on the upper surface of flange 22C of rotary body 22 comes in contact with click plate 24 fixed on the underside of collar 23A of bearing 23.

First, the elastic contact portion is described. As shown in FIG. 1 and FIG. 2, rotary body 22 is provided with first storing hole 22E and second storing hole 22F, which are upwardly opening and bottomed, in two positions point-symmetrical to the rotational center on the upper surface of flange 22C. In first storing hole 22E are stored metallic first retainer 26 having first steel ball 25A, steel ball receiving hole 26A, and first coil spring 28A from the opening side in order. In second storing hole 22F are stored metallic second retainer 27 having second steel ball 25B, steel ball receiving hole 27A, and second coil spring 28B, similarly from the opening side in order. Steel ball receiving hole 26A of first retainer 26 is provided with a tolerance that enables first steel ball 25A to slightly move in the horizontal direction, and it is formed in shape like a columnar depression formed with a flat inner bottom. And, steel ball receiving hole 27A of second retainer 27 is formed in nearly dome-like shape along the outer periphery of second steel ball 25B without allowing the press-fitted state of second steel ball 25B As to the tolerance, the detailed description will be given in the section of operational description given later.

Also, for the convenience of description, different names and reference numerals are used for first storing hole 22E and second storing hole 22F of rotary body 22, first steel ball 25A and second steel ball 25B, first coil spring 28A and second coil spring 28B, which are however same in shape, dimension and material, and as to first retainer 26 and second retainer 27, they are different in shape of steel ball receiving hole 26A, 27A, but same in other shapes.

Click plate 24 fixed on the underside of collar 23A of bearing 23 is, as shown in FIG. 3, formed of nearly annular flat metal plate, and four fixing protrusions 24B disposed on the peripheral edge at equal angles are fitted in the corresponding depressions under collar 23A and held between it and the upper end of case 21.

The underside of click plate 24 has waved convex-concave surface 24A formed in the direction of circumference, and waved convex-concave surface 24A is formed in shape (see FIG. 4 that is a sectional view along the line 4-4 in FIG. 3) along the curved surface drawn by the surface of first steel ball 25A or second steel ball 25B when first steel ball 25A or second steel ball 25B continuously and vertically moves at constant intervals on the circumference about the rotational center of rotary body 22. In addition, it is formed so that the bottom of the concave or the peak of the convex is in a position point-symmetrical to the rotational center. The bottom of the concave of the waved convex-concave surface 24A is shown in FIG. 5 that is a sectional view along the line 5-5 in FIG. 3. The peak of the convex of the waved convex-concave surface 24A is shown in FIG. 6 that is a sectional view along the line 6-6 in FIG. 3.

The first steel ball 25A and second steel ball 25B are upwardly activated by the first coil spring 28A and second coil spring 28B via first retainer 26 and second retainer 27 respectively to come in resilient contact with the waved convex-concave surface 24A of click plate 24, thereby forming the clicking mechanism. It is also allowable to form convex-concave portion 24A in the underside surface of collar 23A of bearing 23 without using click plate 24.

In the rotary clicking composite switch of the present invention having such a clicking mechanism, when operation shaft 12 is rotated, slider 10B of slide 10 moves on common contact 4, first signal contact 5, and second signal contact 6. In this way, first pulse signal is generated from switch terminals 4A, 5A due to on-off operation between common contact 4 and first signal contact 5, and second pulse signal is generated from switch terminals 4A, 6A due to on-off operation between common contact 4 and second signal contact 6, the same as in the conventional example. Also, when operation shaft 12 is pushed and movable contact 7 under push-plate 8 is reversed, then middle contact 2 and outside contact 3 become conductive with each other, thereby establishing a state of being ON between switch terminals 2A and 3A of the push-on switch. With the push operation released, movable contact 7 is restored to a dome-like shape due to its resiliently restoring force, returning to the initial position obtained when operation shaft 12 is not pushed, and at the same time, switch terminals 2A and 3A become insulated in a state of being switched off, the same as in the conventional example, and therefore, the detailed description is omitted.

The operation of the clicking mechanism with operation shaft 12 rotated will be described in the following.

First, the standard condition shown in FIG. 1 where operation shaft 12 is not rotated nor pushed is described. Due to the resilient forces of the first and second coil springs 28A, 28B in the first and second storing holes 22E, 22F of flange 22C of rotary body 22, both of the first and second steel balls 25A, 25B activated by click plate 24 are positioned at the lowest concave bottoms of waved convex-concave surface 24A of click plate 24, and then, rotary body 22 is stable in a stationary state. A state of the clicking mechanism in this standard condition is shown in FIG. 7 and FIG. 8. FIG. 7 is a sectional view in the rotating direction in the vicinity of first storing hole 22E, and FIG. 8 is a sectional view in the rotating condition in the vicinity of second storing hole 22F.

In this condition, when operational portion 12A of operation shaft 12 is rotated, driving means 13 fixed on mount 12C under operation shaft 12 rotates along with it, and rotary body 22 whose protrusion 13B is in engagement with groove 22D also rotates. Due to the rotation of rotary body 22, first steel ball 25A and second steel ball 25B in first storing hole 22E and second storing hole 22F at the upper part of flange 22C are given resilient forces of first coil spring 28A and second coil spring 28B and resiliently slides or rolls on waved convex-concave surface 24A of click plate 24.

That is, in the standard condition, as shown in FIG. 7 and FIG. 8, first steel ball 25A and second steel ball 25B are positioned at the lowest concave bottom of waved convex-concave surface 24A, and when rotary body 22 rotates with operation shaft 12 rotated, second steel ball 25B moves on the sloped surface from the lowest concave bottom of waved convex-concave surface 24A of click plate 24 while pressing down the second coil spring 28B and reaches the convex peak of waved convex-concave surface 24A.

And, rotary body 22 further rotates and second steel ball 25B goes over the convex peak. Simultaneously, second steel ball 25B receiving the resilient force of second coil spring 28B rapidly moves on the sloped surface toward the lowest concave bottom of waved convex-concave surface 24A, which is then stable at the lowest concave bottom. With this rapid movement, operation shaft 12 is also quickly rotated via rotary body 22 and driving means 13. In this way, clicking is generated as second steel ball 25B moves between the lowest concave bottoms, and also, bumping sound is generated as clicking sound when second steel ball 25B rapidly moving on the sloped surface bumps against the next slope that forms the lowest bottom of the concave.

On the other hand, the operation of first steel ball 25A is as follows. First, there is provided a tolerance in the horizontal direction between the steel ball and steel ball receiving hole 26A of first retainer 26, and further, the inner bottom of steel ball receiving hole 26A is formed flat. Accordingly, with the rotation of rotary body 22, first steel ball 25A first slides or rolls, as shown in FIG. 9, so as to come in contact with the wall in the direction opposite to the rotating direction in steel ball receiving hole 26A of first retainer 26. After that, the steel ball moves on the sloped surface of waved convex-concave surface 24A of click plate 24 in the direction of the arrow shown in the figure while pressing down the first coil spring 28A. And, when rotary body 22 further rotates, as shown in FIG. 10, the steel ball reaches the convex peak of waved convex-concave surface 24A.

And, the tolerance that allows first steel ball 25A to slightly move in steel ball receiving hole 26A of first retainer 26 is given so as to make a lag such that first steel ball 25A goes over the convex peak before second steel ball 25B described above reaches the lowest concave bottom after going over the convex peak of waved convex-concave surface 24A. Due to this tolerance, just after second steel ball 25B reaches the lowest concave bottom, first steel ball 25A rapidly moves on the slope toward the lowest concave bottom and reaches the lowest concave bottom as shown in FIG. 11.

In this case, first steel ball 25A powerfully reaches the lowest concave bottom due to the tolerance and therefore powerfully bumps against the next slope. Also, first steel ball 25A bumping against the slope also bumps against for example the wall surface of steel ball receiving hole 26A, repeatedly bumping in a short time and increasing the bumping sound, and thereby, it is possible to obtain clear rhythmical clicking sound.

And, with operation shaft 12 continuously rotated, the operation of each of first steel ball 25A and second steel ball 25B is repeated on waved convex-concave surface 24A of click plate 24, thereby continuously generating rhythmical clicking sound.

Thus, according to the present exemplary embodiment, a tolerance to make a lag such that first steel ball 25A goes over the convex peak before second steel ball 25B goes over the convex peak of waved convex-concave surface 24A and reaches the lowest concave bottom is provided in the horizontal direction between steel ball receiving hole 26A of first retainer 26 and first steel ball 25A. Accordingly, just after second steel ball 25B reaches the lowest concave bottom of click plate 24, first steel ball 25A powerfully moves toward the lowest concave bottom from the convex peak of click plate 24, and then, due to the tolerance between the steel ball and steel ball receiving hole 26A of first retainer 26, bumping of first steel ball 25A is repeated and the bumping sound is increased, thereby obtaining clear rhythmical clicking sound.

Since waved convex-concave surface 24A of click plate 24 is formed so as to be curved along the surface when first steel ball 25A and second steel ball 25B vertically move with rotary body 22 rotated, first steel ball 25A and second steel ball 25B come into contact with waved convex-concave surface 24A in a line-contact fashion at all times. As a result, stresses are diffused without being concentrated on one portion, enabling the reduction of wearing of the contact portions, and it is possible to maintain rhythmical clicking and clicking sound for a long period of time.

Also, clicking is generated by first steel ball 25A and second steel ball 25B resiliently coming in contact with click plate 24 which are disposed at two positions point-symmetrical to the rotational center of rotary body 22. Accordingly, the pressure applied to each clicking portion necessary for obtaining the desired intensity of clicking can be decreased, suppressing the wearing of clicking portions, and it is possible to maintain rhythmical clicking and clicking sound for a long period of time.

In the present exemplary embodiment, the steel balls resiliently coming in contact with the click plate are disposed at two positions point-symmetrical to the rotational center as described, but it is also allowable to dispose the balls at three or more positions and it is preferable to make the arrangement so that the respective steel balls are simultaneously positioned at the lowest concave bottom or the convex peak of the waved convex-concave surface. And, even in case of disposing them at three or more positions, it is preferable to properly set the number of tolerances between the steel ball and the steel ball receiving hole of the retainer so that the desired clicking sound can be obtained.

Also, between first retainer 26 and second retainer 27, except the difference in shape of steel ball receiving holes 26A, 27A, it is not necessary to be same in shape and size for first storing hole 22E and second storing hole 22F of rotary body 22, and first steel ball 25A and second steel ball 25B stored in first storing hole 22E and second storing hole 22F, first retainer 26 and second retainer 27, first coil spring 28A and second coil spring 28B. When there is provided a tolerance to make a lag such that first steel ball 25A goes over the convex peak before second steel ball 25B goes over the convex peak of waved convex-concave surface 24A of click plate 24 and reaches the lowest concave bottom, it is possible to obtain clear rhythmical clicking sound.

The one equipped with a rotary type encoder has been described as an example in the above description, but it is allowable to use the one having a rotary type variable resistor or rotary switch instead.

What is claimed is:

1. A rotary clicking electronic component comprising:
   an insulating case having a fixed conductor disposed at an inner bottom of an opening which is upwardly opening, and a terminal connected to the fixed conductor and led out;
   a rotary body disposed in the opening of the case, having a movable conductor at the bottom thereof, which engages the fixed conductor;
   a bearing fitted on an upper surface at the opening of the case;
   an operation shaft for rotationally operating the rotary body;
   and a clicking mechanism disposed between the bearing and the rotary body,
   wherein the clicking mechanism includes:
   a click plate having a waved convex-concave surface, which is disposed under the bearing in a direction of circumference concentrically with a rotational center of the rotary body at the bottom thereof, and
   an upwardly opening storing hole disposed at an upper part of the rotary body, in which a steel ball, a retainer for retaining the steel ball, and an elastic member for forcing the steel ball to act on the waved convex-concave surface of the click plate via the retainer are stored from the opening side in order.

2. The rotary clicking electronic component of claim 1, wherein there are provided a plurality of the storing holes, disposed at the upper part of the rotary body, in positions equal distance from the rotational center, and the steel ball, the retainer, and the elastic member are respectively stored in a plurality of the storing holes, and a plurality of the steel balls resiliently coming in contact with the waved convex-concave surface of the click plate are simultaneously positioned at lowest concave bottoms or convex peaks of the waved convex-concave surface.

3. The rotary clicking electronic component of claim 1, wherein the storing holes at the upper part of the rotary body are formed of the first storing hole and the second storing hole disposed in positions equal distance from the rotational center, and the first and second steel balls, the first and second retainers, the first and second elastic members are stored in each of the first storing hole and the second storing hole, and there is provided a tolerance between the first steel ball and the steel ball receiving hole of the first retainer so that the first steel ball goes over the convex peak of the waved convex-concave surface of the click plate before the second steel ball in the second storing hole goes over the convex peak of the waved convex-concave surface of the click plate and reaches the lowest concave bottom when the rotary body is rotated relatively to the click plate.

4. The rotary clicking electronic component of claim 1, wherein the waved convex-concave surface of the click plate made of metal is formed in shape along a curve surface drawn by a surface of the steel ball when the steel ball engaging therewith moves in the direction of circumference while moving up and down.

5. The rotary clicking electronic component of claim 1, wherein the click plate is made of metal.

6. The rotary clicking electronic component of claim 1, wherein the insulating case is made of resin.

* * * * *